United States Patent [19]

Fauck et al.

[11] Patent Number: 4,926,907
[45] Date of Patent: May 22, 1990

[54] RELAY VALVE FOR PNEUMATIC OR HYDRAULIC APPLICATION

[75] Inventors: Gerhard Fauck, Hanover; Wolfgang Pohl, Garbsen; Helmut Ulrich, Springe, all of Fed. Rep. of Germany

[73] Assignee: WABCO Westinghouse Fahrzeugbremsen GmbH, Hanover, Fed. Rep. of Germany

[21] Appl. No.: 828,927

[22] Filed: Feb. 12, 1986

Related U.S. Application Data

[63] Continuation of Ser. No. 679,420, Dec. 7, 1984, abandoned.

[30] Foreign Application Priority Data

Dec. 12, 1983 [DE] Fed. Rep. of Germany ....... 3344841

[51] Int. Cl.⁵ ............................................. F16K 21/00
[52] U.S. Cl. ................. 137/627.5; 303/22.1; 303/40
[58] Field of Search ............... 137/627.5; 303/22.1, 303/7, 40, 22.4, 54

[56] References Cited
U.S. PATENT DOCUMENTS 3,525,555 8/1970 Meyer et al. .................. 137/627.5

Primary Examiner—Noah P. Kamen
Attorney, Agent, or Firm—Horst M. Kasper

[57] ABSTRACT

A valve including a housing in which is disposed a relay piston. The relay piston has an upper control surface adjacent a control chamber leading to a control connection. The underside of the relay piston is in communication with a reaction chamber leading to a working pressure connection. An outlet valve seat is formed on the lower extremity of the relay piston. A multistage hollow graduated piston disposed within a graduated bore formed in the housing. The graduated piston has a tapered edge extending downwardly to form an inlet valve seat. A hollow valve element is cooperatively associated with the inlet and outlet valve seats to form inlet and outlet valves. The underside of the graduated piston is located in a reaction chamber which is connected to a second control pressure connection. A supply pressure connection is connected to an annular chamber which is in communication with the inlet valve so the working pressure is gradually increased in steps until a predetermined pressure value representing an emergency situation is exceeded which causes the working pressure to immediately rise to the full pressure value of the supply pressure.

8 Claims, 3 Drawing Sheets

RELAY VALVE FOR PNEUMATIC OR HYDRAULIC APPLICATION

This is a continuation of application Ser. No. 679,420, filed Dec. 7, 1984, abandoned.

FIELD OF THE INVENTION

This invention relates to a relay valve for a pneumatic or a hydraulic braking application for motor and/or trailer vehicles which includes means for causing the working pressure to be increased gradually to a value beyond the delivered control pressure up to the value of the available supply pressure.

BACKGROUND OF THE INVENTION

There are certain known relay valves, one of which is shown and disclosed in published German Patent Application DE-OS 27 03 940. A relay valve of this type is normally located in pneumatic braking installations for vehicles between reservoir and pneumatic consumers, namely, the brake cylinders. When pressurized with a control pressure which is supplied, for example, by a pedal-operated brake valve, an outlet valve connecting a working connection of the valve with the atmosphere is closed, and an inlet valve connecting a reservoir with the working connection is opened. Thus, there is a rapid buildup of pressure to the consumers. When the control pressure decreases or disappears, the inlet valve is closed and the outlet valve is opened, whereupon the consumers are rapidly partly or entirely exhausted to atmosphere.

On such a relay valve, the working pressure exerted and the control pressure are in a specified pressure ratio to one another based on the design of predetermined values established by the ratio of surface areas on the relay piston.

There are applications in which the consumers can function with the design pressure ratio only in a limited control pressure range, and beyond that require an increase in the working pressure, up to the full available supply reservoir pressure, which is graduated and more rapid than that specified by the design pressure ratio.

An example of consumers of this type for motor vehicles with load-controlled brake force controllers is represented by requirements in several countries regarding such braking action. The requirement in these countries is that, in emergency situations, the reservoir pressure available in the vehicle must be able to be released to the brake cylinders in controllable stages. Ordinarily, the load-controlled brake force controllers have a control action with a predetermined correspondence between load status or dynamic axle load and the working pressure (i.e. brake pressure) released, and therefore cannot be used for applications of the type described above.

OBJECTS AND SUMMARY OF THE INVENTION

The problem addressed by the invention is, therefore, the improvement by simple means of a relay valve of the type described above which makes it possible to effectively use ordinary load-controlled brake force controllers during pneumatic braking applications for motor vehicles.

The concept and object of the invention is to define an emergency situation by a predetermined value of a second control pressure, and after this value is exceeded to the increase of the working brake pressure, and thereby a deflection of the design characteristic of the relay valve in the direction of higher working pressures continues, until the entire available supply reservoir pressure is reached. To achieve such a characteristic, it is desirable when the second control pressure defining the emergency situation occurs to increase the control surface area of the relay piston, by adding a supplementary surface.

The preferred embodiments of the invention are particularly addressed to the advantageous manner designing the inlet valve and the outlet valve of the relay valve, and the reaction surface of the relay piston.

This results in an advantageously simple embodiment of the invention, namely, to utilize a predetermined absolute value of the second control pressure to define the emergency situation.

The definition of the emergency situation may be simply put as a predetermined ratio between the second control pressure and the reservoir pressure whereby, even with a fluctuating reservoir pressure, the advanced control capability of the supply pressure to the brakes is always guaranteed.

A first preferred embodiment proposes, after the onset of the emergency situation, the control of the inlet valve and the outlet valve of the relay valve by a second activating means.

A second preferred embodiment proposes that the relay piston be designed as a differential piston with a large control surface and a smaller reaction surface, and that the differential surface be pressurized with the second control pressure up to a maximum value determined by a pressure relief valve. It is apparent that the invention and the preferred embodiment can also be executed with different configurations of the relay valve which increase or decrease the pressure.

When the relay valve described by the invention is used in a pneumatic brake installation for vehicles, the pressure regulated by the brake force controller can advantageously be used as the control pressure, and the unregulated pressure conducted to the brake force controller can be used as the second control pressure.

In addition to the very advantageous application of the relay valve, according to the invention described above in pneumatic brake installations for motor vehicles with load-controlled brake force controllers, the relay valve described by the invention can also be used very advantageously, as its properties and characteristics described below show, in other applications. For example, it could be considered for use on machine tool controls or railway barrier controls.

Briefly, the invention relates to a relay valve for a pneumatic brake application for vehicles comprising, an inlet valve having a control connection which is pressurized with a control pressure and having at least one supply connection which is put in communication with at least one working connection, an outlet valve for connecting the working connection to atmosphere, said inlet valve and outlet valve being operated by a relay piston which can be pressurized by control pressure to move the inlet valve in the opening direction and being operated by the relay piston which can be pressurized by the working pressure supplied to a reaction chamber which is connected to the working connection to move the inlet valve in the closing direction and to move the outlet valve in the opening direction, means which provides a graduated increase of the working pressure beyond the value corresponding to the delivered control pressure up to the available supply pressure, and said means is activated above a predetermined pressure value of a second control pressure.

BRIEF DESCRIPTION OF THE DRAWINGS

The subject invention will be explained below on the basis of several embodiments which are illustrated in the drawings.

DETAILED DESCRIPTION OF THE INVENTION

Figure 1:
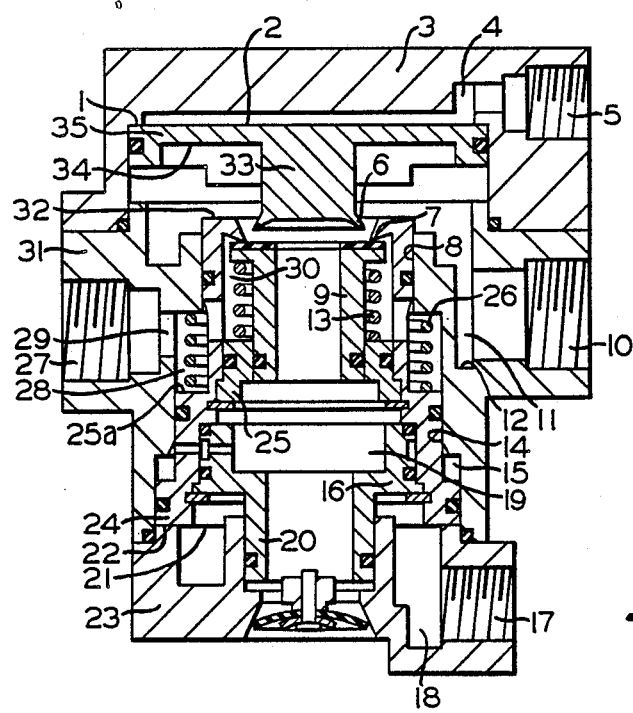
FIG. 1 shows a relay valve with a deflection characteristic with a second control apparatus.

Referring now to the drawings, and in particular to FIG. 1, there is shown a relay valve in which a second control device is integrated into the valve housing to obtain the desired response deflection characteristics.

As shown, the housing includes an upper housing portion 3, a middle housing portion 31, and a lower housing portion 23. A relay piston 35 is located in housing 3, 23, 31 and is guided so that it can longitudinally move in a sealed manner. The top of the relay piston 35, along with the underside of the upper housing portion 3, form a control chamber 4 which can be pressurized with a source of suitable control pressure which is connectable to a control connection 5. The upper side of the relay piston 35, facing the control chamber 4, is designed and constructed as a control surface 2. The middle housing portion 31 is connected with the upper housing portion 3 in a sealed manner, and the middle housing portion 31 includes a supply connection 27 and a working or operating connection 10. The middle housing portion 31 also includes an integral insert which fits into a multistage graduated bore 8, 14, 15. The upper smallest diameter 8 is contiguous with a reaction chamber 11 and is situated below the underside of the relay piston 35 which forms a reaction surface 34. The lower largest diameter 15 of the graduated bore 8, 14, 15 is located in the lower housing portion 23, which is connected in a well-known, airtight fashion with the middle housing portion 31. Between the smallest diameter 8 and the largest diameter 15, there is situated a middle diameter 14 of the graduated bore 8, 14, 15. As shown, the graduated bore 8, 14, 15 accommodates a multistage hollow graduated piston 16, 24, 25, which is designed to have complementary and matching diameters corresponding to the graduated bore. The piston is guided in a sealed manner in the bore; that is, the radial outer surfaces of the graduated piston are sealed against the corresponding surfaces of the bore by suitable sealing rings.

As shown, the upper end of the small diameter portion of the graduated piston 16, 24, 25 is formed as an annulus area, which is designed as a graduation surface 32. The hollow circular area portion includes an internal tapered circumferential depending edge, extending toward the inside of the graduated piston, which serves as an inlet valve seat 7.

It will be seen that a tubular double valve element 9 is disposed on the inside of the graduated piston 16, 24, 25. The tubular double valve element 9 cooperates with the depending peripheral edge of the inlet valve seat 7. The tubular double valve element 9 includes an upper flange portion, extending radially outwardly, having an outer brim cooperating with the circular inlet valve seat 7 and having an inner brim cooperating with a uniaxial circular outlet valve seat 6.

The graduated piston 16, 24, 25 consists of three parts; an outer part 24, an insert 16, and a guide ring 25.

The double valve element 9 moves, guided in a sealed manner in a guide bore of the guide ring 25, fastened in a sealed manner in the inside of the outer part 24 by means of an axial retaining ring.

A closing compression spring 13 is caged between the guide ring 25 and the flange of the double valve element 9 to urge the double valve element 9 against the inlet valve seat 7. As shown, the lower internal end with the large diameter portion of the graduated piston 16, 24, 25 receives, in a sealed internal manner, the bushing or insert 16, which is axially fastened in the graduated piston 16, 24, 25 by means of a suitable snap or retaining ring. The large end surface of the graduated piston 16, 24, 25 cooperates with a second control surface 21 which acts as a lower stop. Depending downwardly from the graduated piston 16, 24, 25, the insert 16 includes a hollow exhaust sleeve 20. The exhaust sleeve 20 is seated in the lower housing portion 23 in a sealed manner. The lower housing portion 23 includes a second control connection 17. It will be seen that situated between the reaction surface 34 of the relay piston 35 and the graduation surface 32 of the graduated piston 16, 24, 25, there is defined a reaction chamber 11 which is connected with the working connection 10.

A depending tappet or stem 33 is formed on the reaction surface 34 of the relay piston 35. The lower edge of tappet 33 forms an outlet valve seat 6 which, with the double valve element 9, form an outlet valve 6, 9.

The inside of the graduated piston 16, 24, 25 and the inside of the double valve element 9 are designed as an exhaust chamber 19. Thus, when the outlet valve 6, 9 is open, the reaction chamber 11 is in communication with the cavity of the exhaust sleeve 20. As shown, a relief or check valve is formed by an elastic diaphragm which is located in the lower housing portion 23 and is in communication with the atmosphere.

When the relay valve is used in installations with pressure fluids, other than air, or in a closed circuit, the exhaust chamber 19 may be placed in communication with an essentially unpressurized reservoir.

The graduations between the small diameter and the middle diameter of graduated piston 16, 24, 25 and the graduated bore 8, 14, 15 form an annular chamber 28, which is in communication through a housing duct 29 to a supply pressure connection 27.

It will be seen that, located on the inside of the graduated piston 16, 24, 25 between the inlet valve 7, 9 and the outer surface of the double valve element 9, there is defined a piston supply chamber 30 which functions as a supply chamber. The supply chamber 30 is in communication through passages in the wall of the graduated piston 16, 24, 25 with the annular chamber 28. The step or ledge on part 24 of the graduated piston 16, 24, 25, facing the annular chamber 28, is designed as a reset surface 25a. In the annular chamber 28, there is disposed a return spring 26 which is gaged between the lower reset surface 25a and an upper step annular ledge formed on the middle housing portion 31 in the annular chamber 28.

In certain applications, which do not have special requirements with respect to the response behavior of the relay valve, the return spring 26 can be eliminated for economic reasons.

In another modified version, the graduated bore 8, 14, 15 and/or the graduated piston 16, 24, 25 may be designed so that the supply pressure existing in the annular chamber 28 has no external effect and exerts no force on the graduated piston 16, 24, 25 in its direction of movement. To accomplish such an operation, the graduated piston 16, 24, 25 could be designed with identical-sized upper and lower graduated surfaces in the annular chamber 28. In such an arrangement, an adjustable control spring would be located between suitable end or graduation surfaces of the graduated bore and of the graduated piston.

The lower housing portion 23 is provided with the second control surface 21. A second control chamber 18 is in communication with the second control connection 17. The surface 21 cooperates with a stop surface 22 located on the lower end of the graduated piston 16, 24, 25 to limit the downward displacement.

The upper housing 3 includes a stop surface 1 by means of which the upward motion of the relay piston 35 is limited as it moves toward the opening direction of the inlet valve 7, 9.

A chamber is formed by the step existing between the medium diameter and large diameter bores in the middle housing portion 31. The graduated piston 16, 24, 25 is in communication through a square passage formed in the graduated piston 16, 24, 25 to the exhaust chamber 19.

It is understood that the invention can also be operated with a single-stage graduated piston and bore without the latter chamber. Also, the invention may be utilized with a graduated piston and bore which employs more than two stages.

The presently-described relay valve functions in the following manner.

The annular chamber 28 and the piston supply chamber 30 are constantly pressurized by the supply connection 27 with the supply pressure delivered by a suitable reservoir (not shown). The supply pressure holds the graduated piston 16, 24, 25 against the stop surface 22 and is assisted by the compression spring 26, which applies a force on the lower reset surface 25a.

The control connection 5 and the second control connection 17 are in communication with a first and second control pressure source, respectively. The two control pressure sources are preferably to be completely independent of one another. However, when the two pressures are combined, the pressures in the first and second control connections 5 and 17 are identical.

The two control pressure sources can also be related to one another, in which case, the first and second control pressures are a given ratio of one another, which may be also variable. Such a situation occurs when one of the control pressure sources is derived from the output of a load-controlled brake force controller and the other of the control pressure sources is taken from the pressure conducted to the load-controlled brake force controller by a brake valve. In this case, the control pressures are in a ratio to one another which is a function of the control ratio of the load-controlled brake force controller, whereby this ratio varies with the load status and the dynamic axle load of the vehicle.

Further, one of the control pressures can be omitted entirely. As a rule, the control pressure sources and the relay valve are supplied from a common reservoir. However, it is possible to employ separate supply sources.

In the rest position, the outlet valve 6, 9 is opened and the working connection 10 is in communication with the atmosphere via the reaction chamber 11 and the exhaust chamber 19. The inlet valve 7, 9 is closed.

Under normal circumstances, both of the control connections are simultaneously pressurized with the first control pressure and the second control pressure. The sequence of operation of the relay valve in this case is achieved in two operating phases.

In the first operating phase, the graduated piston 16, 24, 25 is held against the stop 22 by reaction forces which are produced by the supply pressure, and by the return spring 26 acting on the reaction surface 25a, and by the working pressure which is present in the reaction chamber 11 acting on the graduated surface 32. These reaction forces are operating against the second control force produced by the second control pressure on the second control surface.

In an embodiment not illustrated, in which the supply pressure exerts no free force on the graduated piston in its direction of movement, but the reaction force is simply the effort exerted by the return control spring and the force on the step surface 32 which is a function of the work pressure in the reaction chamber 11.

In this first operating phase, the double valve element 9 is activated exclusively as a function of the equilibrium of forces between the control surface 2 and the reaction surface 34 of the relay piston 35 and the working pressure conveyed to the working connection 10 is essentially identical to the first control pressure. The double valve 6, 7, 9 formed by the inlet valve 7, 9 and the outlet valve 6, 9 both assume a closed position.

In the described embodiment, the relay valve increases or decreases the pressure and the working pressure in this first operating phase is a function of the control pressure which is determined by the design.

The second operating phase begins when the reaction force is overcome by the second control force. The graduated piston 16, 24, 25, at this time, moves upwardly off of the stop 22 into the reaction chamber 11 so that the inlet valve 7, 9 is opened by the tappet 33. Thus, additional air pressure now flows from the piston supply chamber 30 into the reaction chamber 11, whereby the working pressure existing in the reaction chamber 11 from the first operating phase undergoes an increase in value. The equilibrium of forces on the relay piston 35 is thereby removed, and the relay piston 35 is displaced against the stop 1 on the upper housing portion 3. The graduated piston 16, 24, 25 follows this movement with an open inlet valve 7, 9. The inlet valve 7, 9 remains open until an equilibrium of forces is reestablished on the graduated piston 16, 24, 25. The working pressure necessary for this purpose, on account of the ratio of surface areas on the graduated piston 16, 24, 25, is lower than the second control pressure and higher than the level of working pressure which corresponds to the control pressure released at the control connection 5.

When an equilibrium of forces is achieved, the graduated piston 16, 24, 25 moves backward by the closing stroke of the inlet valve 7, 9, and the double valve 6, 7, 9 assumes a closed position, in which both the inlet valve 7, 9 and the outlet valve 6, 9 are closed.

For every increase of the second control pressure, the graduated process described above is repeated. In the second phase of operation, the working pressure released is determined exclusively by the graduated piston 16, 24, 25. The control pressure remains completely without effect, unless it assumes a higher value than the working pressure determined by the graduated piston 16, 24, 25 and if this working pressure is still less than the supply pressure.

When there is a reduction of the control pressure, the sequence of operation described above occurs in the reverse manner.

Figure 2:
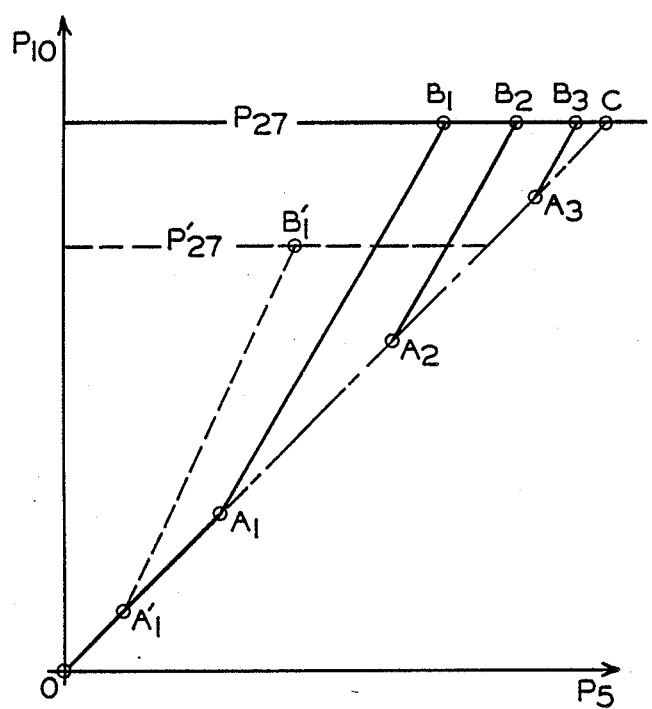
FIG. 2 shows a family of characteristic curves of the relay valve illustrated in FIG. 1.
Figure 3:
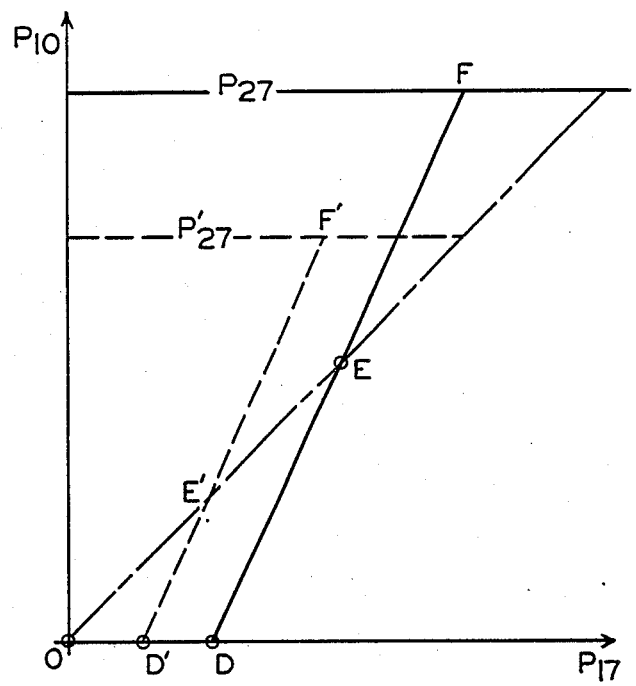
FIG. 3 shows another characteristic of the relay valve illustrated in FIG. 1.

Referring now to FIGS. 2 and 3, there is schematically shown the typical operating characteristic curves of the relay valve described above.

As shown in FIG. 2, the working pressure versus the control pressure is exhibited by the series of plotted curves.

The working pressure, symbolized by $P_{10}$, is plotted on the ordinate. The control pressure, symbolized by $P_5$, is plotted on the abscissa. The supply pressure, assumed to be constant, symbolized by $P_{27}$, is plotted parallel to the abscissa.

The operational behavior of the relay valve is shown for several constant ratios of the first control pressure $P_5$ to the second control press $P_{17}$, whereby the Line $OA_1B_1$ characterizes a small ratio of $P_5/P_{17}$, Line $OA_2B_2$ characterizes an intermediate ratio of $P_5/P_{17}$, Line $OA_3B_3$ characterizes a rather large ratio of $P_5/P_{17}$, and Line $OA_1A_2A_3C$ characterizes a ratio of $P_5/P_{17}$ which is equal to 1.

The segments OA always identify the first phase of operation and represents the same pressure scales on ordinate and abscissa line segment which is inclined at 45°.

The second phase of operation always starts at the points A1, A2 or A3. The applicable characteristic bends at this point upward from the 45° line since the pressure $P_{10}$ in this phase of operation is greater than the pressure $P_5$. The pressure $P_{10}$ increases along the deflected line segment AB to the supply pressure $P_{27}$ at points B1, B2, B3 or C, and remains on this level while $P_5$ continues to increase.

The illustration shows that the larger the ratio $P_5/P_{17}$, the first phase of operation extends in the direction of increasing values for pressure $P_5$, and for identical control pressures ($P_5/P_{17}=1$) there is essentially no excess of the working pressure $P_{10}$ resulting from the design compared to the control pressure $P_5$, i.e., the embodiment illustrated in FIG. 1 behaves sort of like a universal relay valve.

Even when the relay valve is controlled only with the control pressure $P_5$, it behaves like a universal relay valve, and releases a working pressure $P_{10}$ which is essentially identical to the designed pressure (45° line).

In the case of an increase or decrease in the supply pressure, the points B would lie on lines parallel to the abscissa characterizing the new supply pressure, and the salient Points A would be shifted to higher or lower control pressures $P_5$. An example of such a case is plotted with a dotted line in FIG. 2, a lower supply pressure $P'_{27}$ with the corresponding points $A'_1B'_1$.

The position of the salient Points A is determined by the ratio of the control pressures to one another, or by the absolute value of the supply pressure, or by the ratio of surface areas on the graduated piston 16, 24, 25. The slope of the deflected branch of the characteristic curves, i.e., the segments AB, can be determined in advance by the ratio of surface areas between the step surface 32 and the second control surface 21 of the graduated piston 16, 24, 25, and is the same for all ratio of $P_5/P_{17}$.

When pressure $P_5$ decreases, the characteristic curves described above apply in the opposite direction.

As shown in FIG. 3, the working pressure versus the second control pressure is exhibited by the series of plotted curves.

The working pressure is again symbolized by $P_{10}$ and is plotted on the ordinate. The second control pressure is again symbolized by $P_{17}$ and is plotted on the abscissa. A line parallel to the abscissa at the interval of the supply pressure $P_{27}$ again identifies the supply pressure which is represented as constant.

In this illustration, the first phase of operation is characterized by the segment OD on the abscissa, i.e., in the first phase of operation, no working pressure at all is released. In the second phase of operation, working pressure $P_{10}$ increases from Point D along the line DF, is identical at the intersection E with the 45° line to the second control pressure $P_{17}$, and at Point F reaches the level of the supply pressure $P_{27}$. When there is a further increase in pressure $P_{17}$, the pressure $P_{10}$ remains on the level of the supply pressure $P_{27}$.

Assuming identical pressure scales, the slope of the segment DF corresponds to that of the segment AB in FIG. 2, and can be determined in advance in the same manner as described above.

When the supply pressure $P_{27}$ changes, the Points F move correspondingly on the line parallel to the abscissa at a distance to the same, and the Points D and E in the same direction with the supply pressure $P_{27}$ to new values for the second control pressure $P_{17}$. For example, the lower supply pressure $P'_{27}$ is plotted as the dotted line in FIG. 3 with the corresponding Points D', E' and F', whereby the slope of the segment D'E'F' is identical to that of the segment DEF.

The characteristic curves of FIGS. 2 and 3 illustrate that under normal conditions, in which the relay valve and the control pressure source are fed from the same reservoir, the supply pressure can be released securely and, depending on the extent of the ratio of surface areas between the graduation surface 32 and the second control surface 21, can be rapidly and gradually released in proportion to the working pressure. In an embodiment not illustrated, in which the reaction force on the graduated piston is produced by a control biasing spring, the remarks made regarding the characteristic curves in FIGS. 2 and 3 apply accordingly, except that the remarks concerning the case of the modified supply pressure $P_{27}$ do not apply.

The characteristic curves also give an impression that the relay valve, shown in FIG. 1, has many possible applications in machine tools or in railroad gate controls.

The response characteristics illustrated in FIG. 2 of the behavior of the embodiment, illustrated in FIG. 1, of the ratio of the control pressures to one another makes this relay valve particularly suited for applications in pneumatic brake installations for vehicles in which, independent of the control ratio of a load-controlled brake force controller, above a predetermined control pressure, the available supply pressure must be able to be exerted as the braking pressure. In this case, the predetermined control pressure is used for the definition of an emergency situation, or it can be called on for that purpose.

Figure 4:
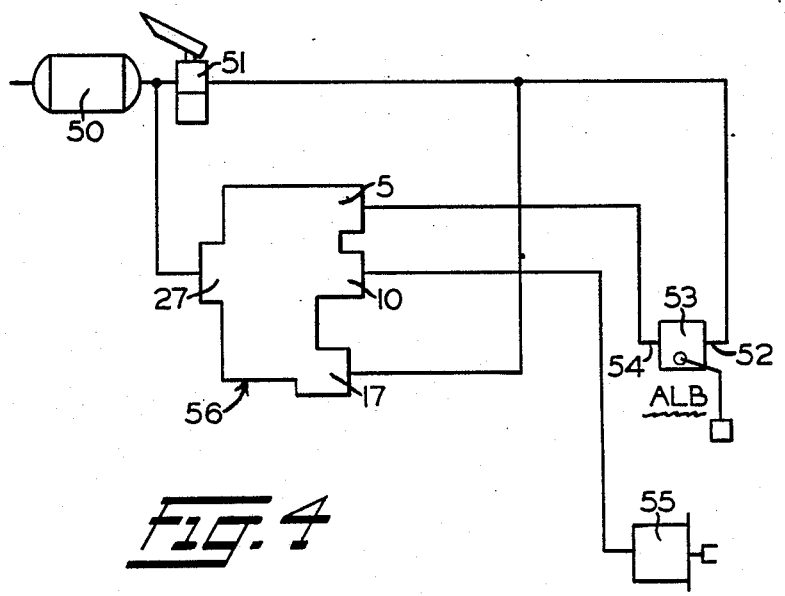
FIG. 4 shows a pneumatic brake installation with a relay valve.

Referring to FIG. 4, there is shown a schematic illustration of a pneumatic brake installation for vehicles which utilizes a relay valve in accordance with the present invention.

The reference numbers of the various connections of the relay valve, shown in FIG. 1, have been used in FIG. 4. This Figure shows a pneumatic brake installation having a reservoir 50, a brake valve 51, a load-controlled brake force controller with a contraction apparatus, namely ALB 53, a brake cylinder 55, and a relay valve 56.

The reservoir 50 is in communication with an input supply connection of the brake valve 51 as well as with the supply connection 27 of the relay valve 56.

The output of the brake valve 51 is in communication with the entrance connection of the controller 53 and with the second control connection 17 of the relay valve 56.

The output 54 of the load-controlled brake force controller 53 is in communication with the control connection 5 of the relay valve 56.

The working connection 10 of the relay valve 56 is in communication with the brake cylinders 55.

In the description of the operation of this vehicular brake application, it is assumed that the functions of the pedal brake valve 51, the load-controlled brake force controller 53, the brake cylinder 55, and the relay valve 56 are all well-known.

When the brake valve 51 is actuated by the operator of the vehicle, the input 52 of the load-controlled brake force controller 53 is pressurized from reservoir 50 and is proportionally reduced to correspond to the control ratio which is set as a function of the load and, in turn, is conveyed to the relay valve 56 at the first control connection 5.

However, full pressure released by the brake valve 51 is directly conveyed to the relay valve 56, namely, to second control connection 17.

Under the action of these two pressures, namely, the first control pressure and the second control pressure, the operation of the relay valve 56 proceeds in the manner indicated in the descriptions of FIGS. 1 and 2.

It is apparent that the pneumatic brake application can also be equipped with a load-controlled brake force controller which is a more economical model in the pressure-reducing feature and may be omitted from the apparatus.

The action of the pneumatic brake system of FIG. 4 will be described with reference to FIG. 5, which is a schematic representation of a portion of the family of characteristic curves which are capable of being produced by the apparatus.

The brake pressure available at the brake cylinders 55 is symbolized by $P_B$ and is plotted along the ordinate. The control pressure released by the brake valve is symbolized by $P_S$ and is plotted along the abscissa. A line parallel to the abscissa represents the supply pressure, which is symbolized by $P_V$ and which is assumed to be constant. The following remarks refer to a relay valve according to the invention, which in the first phase of operation as a result of the design, the work pressure $P_{10}$ released is essentially identical to the control pressure $P_S$. For models which have a different characteristic in the first phase of operation, the following remarks apply with adaptations which will be apparent to a specialist in the field.

The segment OH represents the initial response characteristic during the introductory entrance control phase. In this phase, the brake pressure $P_B$ is essentially identical with the control pressure $P_S$. With the same pressure scales on the ordinate and abscissa, the segment OH runs at an angle of 45° to both coordinates.

During the subsequent control phase, the control characteristic for the fully-loaded vehicle is deflected in the direction of a lower value for brake pressure $P_B$ from the 45° line with H as the salient point, whereby the control characteristics are represented by a bundle of lines which emanate from the Point H.

One of the bundle of lines of the control characteristic for an unloaded vehicle is line $HK_1$, for a partly-loaded vehicle is line $HK_2$, and for a fully-loaded vehicle is line $HK_3$. All of the response curves omit the effects of dynamic axle load shifts.

The characteristic curve $HK_3$ for the fully-loaded vehicle is essentially an extension of the entrance characteristic curve OH in that the control pressure $P_S$ is essentially equal to the full brake pressure $P_B$. The Point $K_3$ is the modulation point, at which the brake pressure $P_B$ is the same as the supply pressure $P_V$, and beyond which the brake pressure $P_B$ can no longer be increased.

During the advanced control phase which follows the subsequent control phase, the load-dependent control characteristics HK, with the exception of the one for the fully-loaded vehicle, are deflected sharply in the direction of higher brake pressures $P_B$ and run steeply on a new characteristic to the modulation Point $K_3$. In the advanced control phase, the line $K_1K_3$ is the control characteristic for the unloaded vehicle, and the line $K_2K_3$ is the control characteristic for the partly loaded vehicle. The characteristics for the vehicle with other load statuses bend correspondingly, while the salient points always lie on the line $K_1K_3$.

The position of the salient Points K can be determined in advance by the surface area ratios on the graduated piston 16, 24, 25 of the relay valve 56, and is also a function of the absolute value of the supply pressure, and to an extent determined by the slope of the line $K_1K_3$ of the control ratio set by the load-controlled brake force controller 53. The slope of the line $K_1K_3$ can be determined in advance by the above-mentioned ratio of surface areas.

If there is a reduction or an increase in the supply pressure to the vehicle, the beginning of the advanced control phase is shifted to lower or higher values for control pressures $P_S$. One example of such a case, in which the supply pressure is reduced, is characterized by the dotted line segment $K'_1K'_2K'_3$. In this case, the supply pressure which is once again assumed to be constant, has dropped to a value $P'_V$. The beginning of the advanced control phase is thereby shifted for the unloaded vehicle from the control pressure $P_S$, identified by Point $K_1$, to a lower value characterized by Point $K'_1$. The Points K' of the other load-dependent control characteristics, e.g. $K'_2$, and the modulation Point $K'_3$, are correspondingly shifted.

The advanced control phase of the pneumatic brake installation corresponds to an emergency situation. Referring to FIG. 5, there is shown that in this emergency situation, regardless of the control ratio of the load-controlled brake force controller 53 and regardless of the absolute value of the supply pressure, the available supply pressure is rapidly, controllably, and securely released as the brake pressure to the brake cylinders 55. The family of characteristic curves for a pneumatic brake arrangement not illustrated, in which the load-controlled brake force controller does not have an entrance device, the above remarks apply correspondingly, with the exception that Point H forms the point of origin of the coordinate system.

Figure 5:
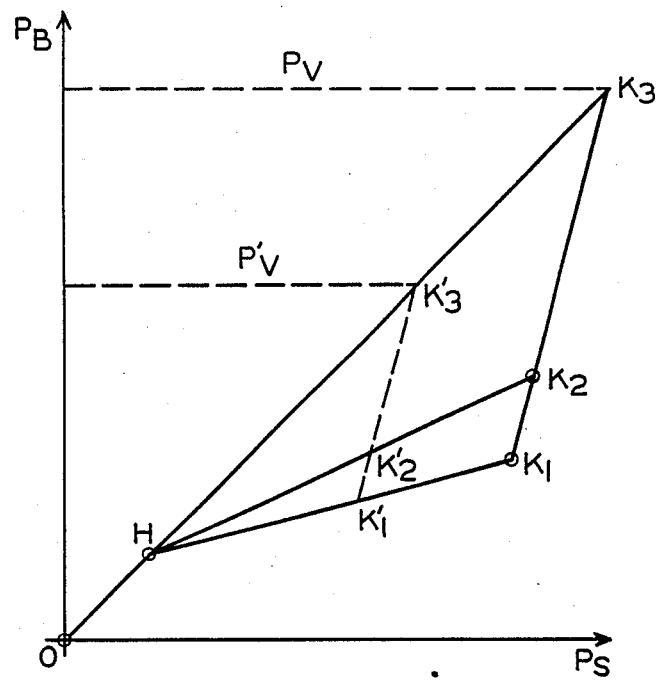
FIG. 5 shows a detail of the characteristics of the pneumatic brake installation illustrated in FIG. 4.

For a brake installation with a relay valve 56, as described by the invention in an embodiment not illustrated, in which the restoring force on the graduated piston is produced by a control spring, the remarks made concerning the family of characteristic curves of FIG. 5 apply accordingly, with the exception that when the supply pressure $P_V$ drops, the salient Points K are not shifted to lower values for control pressures $P_S$. This means that in these embodiments, an advanced control phase can only occur so long as the supply pressure is higher than the control pressure $P_S$ corresponding to the salient point of the control characteristic in question. In such a brake installation, therefore, the emergency situation is defined by the absolute value of the control pressure $P_S$.

Figure 6:
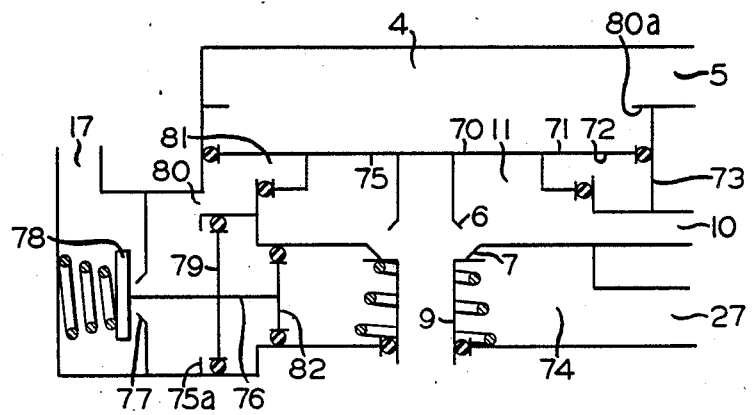
FIG. 6 shows a relay valve with a deflection characteristic with an integrated pressure relief valve.

Referring now to FIG. 6, there is illustrated a schematic representation of a relay valve with means engaging the relay piston for the initiation and control of the second phase of operation.

The components, connections, and chamber having the same function are again identified by the same reference numbers as in FIG. 1.

As shown, a control chamber 4 is located above the relay piston 70 which is connected with the control connection 5, and a reaction chamber 11 is located below the relay piston 70 which is connected with the working connection. Located below the relay piston 70 is the double valve 6, 7, 9.

In this embodiment, the relay valve 70 is designed as a differential piston with a large upper control surface 71 and a smaller lower reaction surface 75. The differential surface 72, which accounts for the difference in surface areas between these surfaces, is also situated on the bottom of relay valve 70.

The reaction surface 75 of the relay piston 70 borders the reaction chamber 11. Between the differential surface 72 and the housing 73 is defined a differential chamber 81 which is in communication with the second control connection 17 via a housing duct 80 and a pressure relief valve 77, 78.

The pressure relief valve 77, 78 includes a valve element 78, which is resiliently biased toward its closed position by, a closing spring. The pressure relief valve includes a valve seat 77 which is integral with the housing.

Located coaxial to the pressure relief valve 77, 78 is the housing wall of a supply chamber 74 connected with the supply connection 27. The supply chamber is designed as a graduated bore in which a graduated piston 76 moves longitudinally, which is guided in a sealed manner. The graduated piston 76 has a small surface 82 which borders the supply chamber 74, and has a large surface 79 which faces the pressure relief valve 77, 78. The valve element 78 is activated by means of a tappet-like extension.

The movement of the graduated piston 76 toward the pressure relief valve 77, 78 is limited by a housing stop 75a.

A safety stop 80a is disposed in the control chamber 4 to limit the upward movement of the relay piston 70.

In the following explanation of the function of the embodiment illustrated in FIG. 6, let us assume that the supply connection 27 is connected to a suitable pressure reservoir, that the working connection 10 is connected with the consumer or consuming device, and that the first control connection 5 and the second control connection 17 are connected to first or second control pressure sources, respectively.

It will be appreciated that there is a multitude of possible embodiments of the control pressure and that the remarks and explanation relating to the embodiment of FIG. 1 correspondingly apply in the present instance.

In the rest position, the control chamber 4, the reaction chamber 11, and the differential chamber 81 are exhausted to atmosphere. The graduated piston 76 is pressurized by the supply pressure and is urged against the housing stop 75a. Thus, the pressure relief valve 77, 78 is in its open position.

It will be appreciated that the operating characteristics of the subject embodiment are dependent on the ratio of the first control pressure in relation to the second control pressure. In the following explanation, the same symbols used for FIGS. 2 and 3 will be used again.

If there is no second control pressure $P_{17}$, i.e., if $P_{17}/P_5=0$, then the working pressure $P_{10}$ is higher than the first control pressure $P_5$ in accordance to the ratio of the control surface 71 of the relay piston 70 to its reaction surface 75.

When the ratio $P_{17}/P_5$ increases, the ratio between the working pressure $P_{10}$ and the control pressure $P_5$ becomes smaller. For a ratio $P_{17}/P_5=1$, the working pressure $P_{10}$ and the control pressure $P_5$ are essentially equal.

For the ratio $P_{17}>P_5$, the working pressure $P_{10}$ is reduced or lowered from the first control pressure $P_5$.

If only a second control pressure $P_{17}$ is applied, then a locking function occurs for the working pressure $P_{10}$. In this case, an undesirable large displacement of the relay piston 70 upward is prevented by the safety stop 80a.

In the embodiment illustrated in FIG. 6, there is a variable control characteristic, which normally extends from a pressure-reducing to a pressure-increasing characteristic.

The characteristic determined by the specified ratio of surface areas on the relay piston 70 and the applicable pressure ratio $P_{17}/P_5$ is directed in the direction of higher working pressures $P_{10}$ up to the available supply pressure, when the second control pressure $P_{17}$ reaches the limit pressure of the pressure relief valve 77, 78.

At this time, the force exerted by the supply pressure on the small surface 82 of the graduated piston 76 is overcome by the second control pressure $P_5$ acting on the large surface 79 of the graduated piston 76. The graduated piston 76 is now moved away from the housing stop 75a and into the supply chamber 74, whereby the pressure relief valve 77, 78 closes under the action of the biasing spring. The slope of the characteristics above the salient point is determined by the ratio of surface areas on the relay piston 70. If the supply pressure decreases or increases, the salient points are correspondingly shifted to lower or higher values for the second control pressure $P_{17}$.

From the numerous variable operating characteristics of the embodiment illustrated in FIG. 6, it is apparent to the specialist in the field that this can also be applied in numerous ways in different areas of application.

The embodiment illustrated in FIG. 6 can also be used with a relay valve 56 in the pneumatic brake installation illustrated in FIG. 4.

In a family of characteristics illustrated in FIG. 5, the characteristic of this embodiment is represented so that, by contrast to the embodiment illustrated in FIG. 4, the geometric location of the salient point is a line parallel to the ordinate at the interval of the limit pressure of the pressure relief valve 77, 78. Each control characteristic runs from its salient point with the slope determined by the ratio of surface areas on the relay piston 70 to the 45° line upward, and after it reaches it, continues up to the available supply pressure. The bundle of lines therefore forms, on each side of the salient points, a bundle of parallel straight lines which, after reaching the 45° line, are joined on it.

If the supply pressure decreases or increases, the geometric location of all the lines parallel to the ordinate forming salient points will also shift in the direction of lower or higher values for the control pressure $P_S$. From this shifted starting basis on, the braking installation once again exhibits a characteristic which corresponds to that described above.

It will be apparent to a specialist in the field that for the control of the pressure relief valve 77, 78, in place of the graduated piston 76, a control spring can also be used. In this case, with a changing supply pressure, the lines parallel to the ordinate forming the geometric location of all the salient points will not shift, and its position would therefore be dependent only on the absolute value of the control pressure.

It will be apparent to the specialist in the field that the embodiment illustrated here, and any other form of a relay valve as described by the invention, can also be used in installations using pressure fluids other than air.

In another model of an embodiment (not shown), the differential chamber 81, instead of being connectable to the second control connection 17, can be connected by means of a valve with the reaction chamber 11. The valve is controlled by a graduated piston, which is pressurized on its large surface by the second control pressure, on its small surface by the working pressure from the reaction chamber 21, and on the differential surface with the supply pressure.

The valve and thus the communication between the differential chamber 81 and the reaction chamber 11 is opened, as long as the sum of the forces from the supply pressure and working pressure on the graduated piston exceeds the force exerted on the latter by the second control pressure.

The valve and thus the communication between the differential chamber 81 and the reaction chamber 11 is closed, if the force exerted by the second control pressure on the graduated piston exceeds the sum of the forces exerted by the supply pressure and the brake pressure on the graduated piston.

The second phase of operation of this modified embodiment starts with the closing of the valve. For the characteristics of this embodiment, the remarks made with regard to the examples illustrated in FIGS. 1 and 4 and the family of characteristics illustrated in FIGS. 2, 3 and 5 apply fully.

Thus, the present invention has been described in such full, clear, concise and exact terms as to enable any person skilled in the art to which it pertains to make and use the same, and having set forth the best mode contemplated of carrying out this invention. We state that the subject matter, which we regard as being our invention, is particularly pointed out and distinctly claimed in what is claimed.

It will be understood that variations, modifications, equivalents and substitutions for components of the above specifically- described embodiment of the invention may be made by those skilled in the art without departing from the spirit and scope of the invention as set forth in the appended claims.

Having thus described our invention, what we claim as new and desire to secure by Letters Patent, is:

1. A relay valve for a pneumatic brake installation for vehicles, comprising:
    (a) an inlet valve having a first control connection which is in communication with a source of a first control pressure and having at least one supply connection which is in communication with a source of a supply pressure and which is put in communication with a source of at least one working connection;
    (b) an outlet valve for connecting the working connection to the atmosphere;
    (c) said inlet valve and said outlet valve being operated by a relay piston which is in communication with the first control pressure to move the inlet valve in an opening direction and to move the outlet valve in a closing direction, and being operated by the relay piston which is in communication with the working pressure supplied to a reaction chamber which is connected to the working connection to move the inlet valve in a closing direction and to move the outlet valve in an opening direction;
    (d) graduated piston means located adjacent to the inlet and outlet valves for providing a graduated increase of the working pressure greater than the value corresponding to the first control pressure, up to the available supply pressure; and
    (e) said graduated piston means is activated above a predetermined pressure value of a source of a second control pressure.

2. The relay valve, according to claim 1, wherein said relay piston is sealed in a housing and guided to move longitudinally in the housing and is located between a reaction chamber and a control chamber.

3. The relay valve, according to claim 1, wherein said inlet valve and said outlet valve are formed by a double valve with a double valve element.

4. The relay valve, according to claim 1, wherein said graduated piston means is capable of opening and closing said inlet valve and said outlet valve.

5. The relay valve, according to claim 1, wherein said graduated piston means includes an activating means functionally interrelated to the inlet valve and the outlet valve which can be adjusted by the second control pressure in the opening direction of the inlet valve and which can be adjusted by the supply pressure in the closing direction of the inlet valve.

6. A relay valve for a pressure fluid system comprising:
    (a) an inlet valve connecting at least one supply connection in communication with a source of supply pressure with at least one working connection in communication with a working chamber when a first control connection is in communication with a source of a first control pressure;
    (b) an outlet valve for connecting the working connection to the atmosphere;
    (c) said inlet valve and said outlet valve being operated by a relay piston, the relay piston being acted upon by the first control pressure in the opening direction of the inlet valve and in the closing direction of the outlet valve and being acted upon by a source of working pressure supplied to a reaction chamber in the closing direction of the inlet valve and in the opening direction of the outlet valve;

(d) said reaction chamber being connected with the working chamber;

(e) graduated piston means providing a graduated increase of the working pressure greater than the value corresponding to the first control pressure, up to the available supply pressure; and (f) said graduated piston means being activated above a predetermined pressure value of a source of a second control pressure supplied to a second control connection.

7. A relay valve for a pressure fluid system comprising:

(a) an inlet valve connecting at least one supply connection with at least one working connection when a first control connection is in communication with a source of a first control pressure;

(b) an outlet valve for connecting the working connection to the atmosphere;

(c) said inlet valve and said outlet valve being operated by a relay piston, the relay piston being acted upon by the first control pressure in the opening direction of the inlet valve and in the closing direction of the outlet valve and being acted upon by a source of working pressure supplied to a reaction chamber in the closing direction of the inlet valve and in the opening direction of the outlet valve;

(d) graduated activating means positioned adjacent to said inlet valve and said outlet valve;

(e) said graduated activating means being urged in closing direction of said inlet valve and in opening direction of said outlet valve by a compression spring internally located within said graduated activating means and the working pressure; and (f) said graduated activating means being urged in opening direction of said inlet valve and in closing direction of said outlet valve by a source of a second control pressure supplied to a second control connection and moved to open said inlet valve and to close said outlet valve when said second control pressure is sufficiently high to overcome the forces exerted on said graduated activating means by said compression spring and the working pressure.

8. A relay valve for a pneumatic brake installation for vehicles, comprising:

(a) an inlet valve having a first control connection which is in communication with a source of a first control pressure and having at least one supply connection which is in communication with a source of supply pressure and which is put in communication with at least one working connection;

(b) an outlet valve for connecting the working connection to the atmosphere;

(c) said inlet valve and said outlet valve being operated by a relay piston which is in communication with the first control pressure to move the inlet valve in an opening direction and to move the outlet valve in a closing direction, and being operated by the relay piston which is in communication with a source of working pressure supplied to a reaction chamber which is connected to the working connection to move the inlet valve in a closing direction and to move the outlet valve in an opening direction;

(d) graduated piston means located adjacent to the inlet and outlet valves for providing a graduated increase of the working pressure greater than the value corresponding to the delivered control pressure, up to the available supply pressure; and (e) said graduated piston means is activated above a predetermined pressure value of a source of a second control pressure;

(f) the relay valve is located in a pneumatic braking installation with vehicles having a load-controlled braking force controller;

(g) the supply connection is connected with a reservoir on the vehicle (h) the working connection is connected with at least one brake cylinder on the vehicle (i) the first control connection is connected with the output of the load-controlled brake force controller; and (j) the second control pressure is conveyed to a second control connection which is connected with the input of the load-controlled brake force controller.

* * * * *